Jan. 28, 1964  T. J. AMBROSE  3,119,961
GATED SPECTRUM ANALYZER INCLUDING VARIABLE BANDWIDTH FILTER
Filed Aug. 31, 1960

INVENTOR
THOMAS J. AMBROSE

BY Hurwitz & Rose

ATTORNEYS

United States Patent Office 3,119,961
Patented Jan. 28, 1964

3,119,961
GATED SPECTRUM ANALYZER INCLUDING
VARIABLE BANDWIDTH FILTER
Thomas J. Ambrose, Fairfax, Va., assignor to Melpar,
Inc., Falls Church, Va., a corporation of Delaware
Filed Aug. 31, 1960, Ser. No. 53,117
11 Claims. (Cl. 324—77)

The present invention relates generally to spectrum analyzers, and more especially to scanning super heterodyne spectrum analyzers arranged to provide a time-frequency-amplitude plot, and having provision for adjusting intermediate frequency band-width at will, and for reducing bandwidth below that provided by intermediate frequency filters, by means of gating techniques, for all adjustments.

Briefly describing a preferred embodiment of the invention, frequency analysis is performed by heterodyning the output of a sweep frequency oscillator with a prerecorded signal, to derive a different frequency. The latter is fed to a narrow band-pass I.F. filter. The filter output is amplified to provide activating current for a recording stylus. Current sensitive recording paper is moved longitudinally past the stylus at a relatively rapid rate, in synchronism with read-out of the recorded signal. The stylus is simultaneously slowly moved transversely of the paper in synchronism with frequency sweep. To a first approximation the stylus, at any given position of the recording paper, records signal amplitudes of the entire signal, over real time, for one given signal frequency. This implies that read-out occurs for all positions of a rotating drum on which the signal is pre-recorded. Frequency position and lateral stylus position are then slightly modified, and a further time-amplitude plot generated for the entire signal. By examining all frequencies of interest, a plot is generated in which intensity of recording is representative of signal amplitude for a single frequency component, longitudinal position along the recording paper represents real time, and lateral position represents frequency. Systems of this general type are known in the art.

According to the present invention, in systems of the above general type, and in spectrum analyzers of the scanning or superheterodyne type generally, provision is desirable for adjusting the I.F. band width and thus the visual or frequency resolution attainable by means of the analyzer. It is a feature and object of the present invention to provide a novel system of I.F. bandwidth selectivity control for scanning spectrum analyzers.

In systems for controlling band-pass filters selectivity, in general, band-pass may be controlled without regard to amplitude response variations concurrently introduced. Spectrum analyzers are precision instruments for measurement, and are usually calibrated in respect to response. It is therefore highly desirable that the responses of such instruments remain constant for any value of I.F. selectivity. It is a feature and object of the present invention to provide a scanning spectrum analyzer having selectivity control, in which amplitude of response is independent of selectivity.

It is well known that the scan rate in cycles per second in superheterodyne spectrum analyzers must be suitably related to I.F. band width. Simple calculations suffice to demonstrate that if very low resolution is to be attained in an audio superheterodyne spectrum analyzer, by employing narrow band I.F. filters, the total time required for each scan through the audio band becomes excessive. Further, most I.F. filter characteristics have sloping skirts, e.g. do not possess infinitely sharp cut-off characteristics. According to the present invention, I.F. selectivity is enhanced by employing gates controlled by a frequency discriminator, to cut off the response of the system at frequencies removed by a predetermined amount from the center frequency of its I.F. filter, thereby providing a system which operates as if provided with a filter having infinitely sharp skirts, as well as a system which has greater selectivity than is provided by the I.F. filter bandwidth itself, and a system in which the detrimental results of the finite response times of I.F. filters are avoided.

In systems employing both variable I.F. filters and frequency discriminator controlled gating circuits for the outputs of the latter, it is desirable that the gating circuits be controlled concurrently with filter band, by controlling the points along the discriminator characteristic at which cut-off occurs. For wide filter bands, the gating circuits should be relatively wide, while for narrow filter bands off-gating should take place more closely adjacent to the center frequencies of the filters.

It is, accordingly, an object and feature of the invention to provide a spectrum analyzer in which provision is made for both I.F. filter adjustability and frequency gate adjustability, in which the adjustments are ganged to provide compatible operation.

The above and still further objects, features and advantages of the present invention will become apparent upon consideration of the following detailed description of one specific embodiment thereof, especially when taken in conjunction with the accompanying drawings, wherein.

Figure 1:
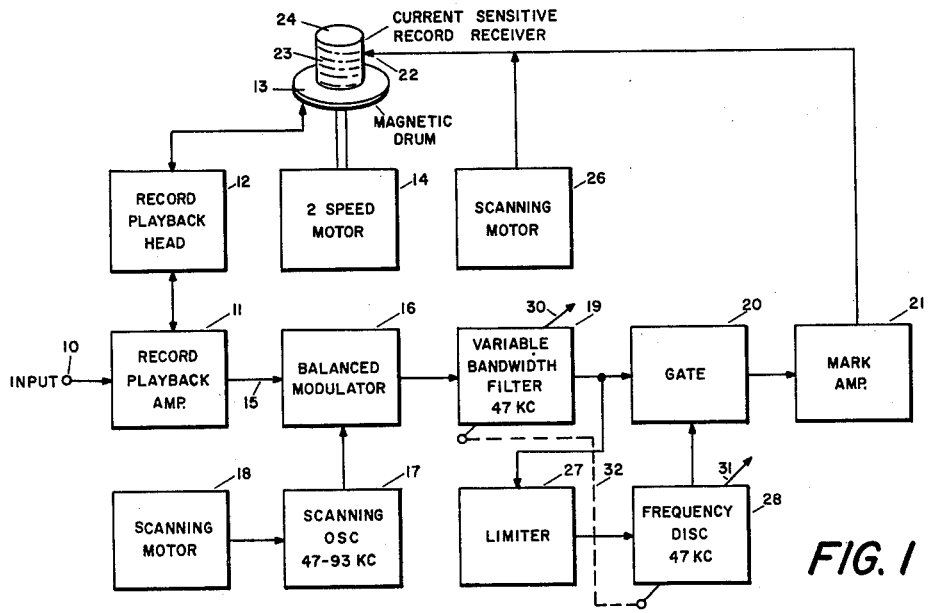
FIGURE 1 is a block diagram of a system according to the invention.

Referring now more specifically to the accompanying drawings, the reference numeral 10 denotes an audio signal input terminal. The input signal is amplified in a record-playback amplifier 11, and applied to a record-playback head 12, which effects magnetic recording of the signal applied to terminal 10 on a magnetic drum 13. The latter is driven by a two speed motor 14, operating in its slow mode during recording. After a signal sample is recorded, the instrument is prepared for an analysis of the recorded signal.

The motor 13 may then be adjusted into its fast mode, and the recorder-reproducer adjusted to its "reproduce" condition. The reproduced signal appears on lead 15. It will be appreciated that reproduction can also occur with motor 13 operating in its slow mode.

The signal appearing on lead 15 has all its frequencies displaced upwardly, when slow record and fast play-back is employed. However, the system is capable of employing slow record and slow play-back, in which case no frequency displacement occurs; in any event, the principle and mode of operation of the invention are not affected by the speeds employed for recording and play-back.

The signal on lead 15 is applied to an input of a balanced modulator 16, operating as a heterodyne converter. To the converter 16 is also applied the output of a scanning local oscillator 17, which is frequency scanned over a suitable range by means of a scanning motor 18. The output of the balanced modulator 16 is applied to a variable bandwidth I.F. filter 19. To provide specific examples of frequencies employed, the filter 19 may have a center frequency response at 47 kc., and the oscillator 17 may scan the range 47 to 93 kc. This scanning range permits heterodyning down to zero input frequency, as well as providing for heterodyning with high speed read-out.

The output of filter 19 is applied to a gate 20, normally open, and the output of the latter is applied to a mark amplifier 21, which energizes a recording stylus 22. The latter supplies current to a sheet of current sensitive recording paper 23, wound on a drum 24 which is driven concurrently with, or in synchronism with, the magnetic drum 13. A scanning motor 26 moves the stylus 22 transversely of the record receiver 23, in synchronism with scanning of oscillator 17, so that at one edge of the receiver the record made is for minimum frequency and at the other edge is for maximum frequency.

The output of the filter 19 is applied to an amplitude limiter 27, which levels output to a fixed value. The output of limiter 27 is applied to a frequency discriminator 28, which has a zero response at 47 kc., the center frequency of filter 19. The discriminator 28 developes a gate voltage, suitable for turning off the gate 20, whenever the input from discriminator 28 departs sufficiently from its zero level, representative of 47 kc. input. The gate 20 accordingly is open while the input to filter 19 is equal to its center frequency, or departs therefrom by some predetermined small increment, and otherwise is closed.

The discirminator 28 is adjustable in respect to its gating limits, e.g. it can be adjusted to generate an off-gate voltage for various predetermined increments of departure from 47 kc. Similarly, the filter 19 can be adjusted to provide various predetermined bandwidths. The two adjustments are ganged, so that for each filter bandwidth, the discriminator 28 and its gate 20 can operate to reduce system bandwidth by some predetermined fractional amount.

The bandwidth control for filter 19 is indicated by arrow 30, and for discriminator 28 by arrow 31, control ganging being indicated by dotted line 32.

Analyzing the operation of the present invention, the heterodyning system is set for any signal input frequency by oscillator 17. The input signal is analyzed, throughout a recorded sample, to determine amplitudes of the set frequency over the entire signal, i.e. in real time, and a record is made in terms of density modulation along a longitudinally extending line of the record receiver, representing amplitude at each point of the record for the frequency being examined. For each succeeding rotation of the magnetic drum 13 and the record receiver 23, the response frequency of the system is modified slightly and the lateral position of stylus 22 correspondingly modified, and a longitudinal plot recorded of amplitude of response at the new frequency.

When a recording is completed, it represents a plot of time-frequency-amplitude, the time axis being equated with position along magnetic drum 13, amplitude being recorded as density of record, and the frequency axis extending transversely of the record receiver 23.

Figure 2:
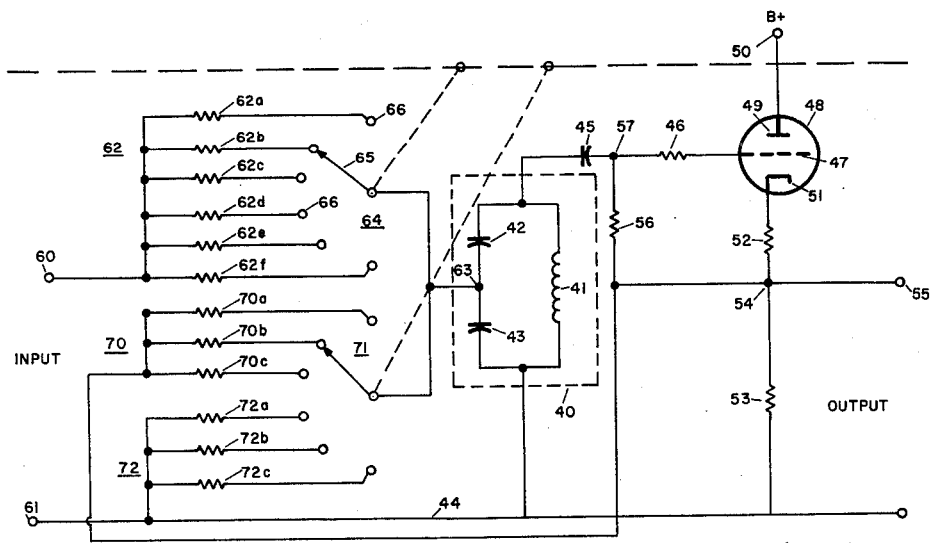
FIGURE 2 is a circuit diagram of a variable band width filter, employed in the system of FIGURE 1.

Reference is now made to FIGURE 2 of the accompanying drawings, wherein is illustrated a schematic circuit diagram of the filter 30. In filters of simple design, having provision for band pass variation, gain and bandpass are interrelated, e.g. a change in bandwidth is accompanied by a change in gain. The filter of the present invention enables variation of band-pass over a wide range, while gain remains constant.

In the circuit diagram, a filter circuit 40 is provided which is essentially a parallel-resonant circuit, including an inductance 41, paralleled by two series capacitors 42, 43. One side of filter 40 is connected directly to a reference lead 44. The other side is coupled by coupling capacitor 45 and protective or current limiting resistance 46 to the grid 47 of a vacuum tube 48. The anode 49 of the latter is connected directly to a B+ terminal 50. The cathode 51 of tube 48 is connected in series with resistances 52, 53, acting as a cathode load, to reference lead 44. Junction 54, between resistances 52, 53, is connected directly to an output terminal 55, and via a resistance 56 back to the junction 57 between capacitor 45 and resistance 56, to provide some negative feed-back.

Input terminals for the system are provided at 60 and 61, the latter being connected to lead 44. An array of parallel resistances 62 is connected between terminal 60 and the junction 63 between series capacitors 42, 43, representing a low impedance point of circuit 40. The resistances 62 may all be of different magnitudes, and are selected one at a time for inclusion in the circuit, by selection switch 64, having a movable selection arm 65 and stationary contacts 66, each associated with one of the resistances 62. Separate resistances of array 62 may be identified by letter suffixes a–f, inclusive.

An array 70 of three resistances 70a, 70b, and 70c, are connected selectively between output terminal 55 and terminal 63 of circuit 40 by switch 71. Further resistances 72a, b, c are connected between lead 44 and junction 63 by means of switch.

In operation, a signal at the input terminal 60 is applied to a low impedance point 63 of parallel resonant circuit 40 through one of the resistances 62, selected by bandwidth selector switch 64. The value of the selected resistance determines and is inversely proportional to the bandwidth desired at output terminal 55. Switches 71 and 64 are ganged, so that selection of one of resistances 62 is accompanied by selection of one of resistances 70 or 72. Resistances 70, since they are connected between output terminal 55 and junction 63, provide positive feed-back from the cathode circuit of cathode follower tube 48. Resistances 72, on the other hand, load the parallel resonant circuit 40 and also provide a voltage divided input to junction 63.

A very wide range of bandwidths is obtainable, ranging from values narrower to values wider than the natural width of parallel resonant circuit 40. This width is extended when the circuit is loaded, and is narrowed when positive feed-back is provided.

While I have shown junction 63 as a driving point for circuit 40, a point on inductance 41 could have been substituted. In either case a low impedance point is desired.

The system as illustrated in FIGURE 2 provides for six discrete bandwidths, three of which are narrower and three of which are wider than the natural frequency of filter 40. However, any desired number of wider and narrower band-width values can be attained, by providing an increased number of switching points, and continuous variation of bandwidth is attainable by applying continuously variable resistances.

The circuit loading resistances 62, 72 and the positive feed-back control resistances 70 of themselves would provide a variation of gain accompanying a variation of bandwidth or circuit Q. Utilization of pairs of resistances enables modification of gain to compensate for changes of circuit Q.

Obviously, pass values are affected by the impedance of the drive circuit which supplies signal to terminal 60, and by the value of resistance 53. It is feasible, nevertheless, to change the value of parallel resonant circuit 40, either by loading or by postiive feed-back, and to compensate on the corresponding change in gain of the circuit.

In one practical design of a circuit according to the present invention where tube 48 was a type 6AU6 pentode, and wherein resistance 53 was 330Ω and resistance 53 was 10K, suitable values of resistances 70a–70c, 72a–72c were 50K, 100K, 1 meg., 50K, 20K, and suitable values of resistances 62a–f were 8.2K, 15K, 19.5K, 23K, 31.2K and 34.5K.

Figure 3:
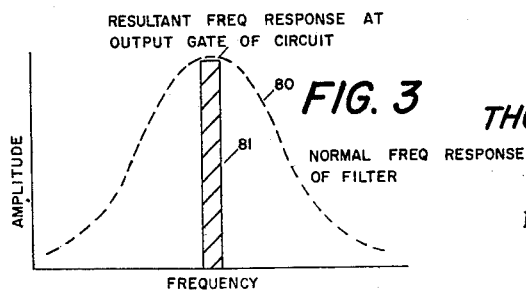
FIGURE 3 is a plot of frequency responses, useful in explaining the operation of the system.

Referring now to FIGURE 3 of the accompanying drawings, the reference numeral 80 denotes the selectivity curve of the filter 19. The shaded area 81 represents the frequency increment for which the discriminator 28 provides a sufficiently low output of gating signal to maintain the gate in open condition. When the frequency applied to the discriminator 28 departs from the zero response point thereof sufficiently, either above or below, a gate voltage of adequate amplitude to close the gate 20 is developed. If a discriminator is employed which has zero response at one predetermined frequency, and alternately positive and negative responses above and below the one predetermined frequency, one of latter responses can be polarity reversed to provide two gating signals of the same polarity. Control of response of the discriminator can be provided, to establish a frequency gate circuit having adjustable limits, by introducing adjustable loading, or providing a controllable voltage divider at the input or output of the discriminator, and in other ways which are well understood in the art.

In one practical embodiment of the present invention, resolutions of 12, 23, 30, 36, 45, and 72 c.p.s. were made available, coupled with scan times of 200, 400, 1600, and 3200 c.p.s./min., the gain of the entire analyzer remaining constant for all values.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a spectrum analyzer for a band of signals, including a superheterodyne receiver having scanning local oscillator and a heterodyne converter coupled to said oscillator and said signals for deriving an I.F. frequency, an I.F. amplifier connected in cascade with said converter, and an output visual display system coupled to said I.F. amplifier, the combination of switch means connected between the output of said I.F. amplifier and the input of said display system, a frequency discriminator coupled in cascade with said I.F. amplifier, said discriminator having a zero response at a mid-frequency of said I.F. amplifier, means for deriving a control signal for said switch from said discriminator, said control signal activating said switch means so the I.F. amplifier output is applied to the recorder input only when said discriminator is responsive to I.F. frequencies within a predetermined band centered by said mid-frequency, said I.F. amplifier having a considerably wider bandwidth at its half power points than the width of said predetermined band so that the combined gain of said I.F. amplifier and switch is substantially constant for all frequencies within said predetermined band.

2. In combination, a source of a time varying signal having a frequency spectrum, means for recording said time varying signal, means for reproducing the recorded signal, a spectrum analyzer coupled to said means for repeatedly reproducing the recorded signal, said spectrum analyzer including a heterodyne modulator coupled in cascade to said reproducer, an intermediate frequency amplifier coupled in cascade with said modulator, a marking means for marking on a mark receiver as a function of the amplitude of response of said intermediate frequency amplifier, a scanning local oscillator coupled to said modulator, means for relatively moving said marking means and said mark receiver in synchronism with said scanning local oscillator, said intermediate frequency amplifier including an active filter, said active filter including a parallel resonant circuit having a normal Q value, where Q is the figure of merit of said filter, switching means for at will changing said Q value including means for at will raising and lowering said Q value selectively, said active filter including means for normalizing the response of said filter to a common level for all said Q values.

3. The combination according to claim 2 wherein is further produced means comprising a frequency discriminator circuit for blocking said marking means for all frequencies outside a pair of predetermined values located internally of the selectively characteristic of said intermediate frequency amplifier.

4. A variable band-width filter having constant gain, said filter including a parallel resonant circuit, a cathode follower amplifier having an input circuit and a cathode follower output circuit, means coupling said parallel resonant circuit to said input circuit, means coupling said output circuit regeneratively to said input circuit, said last means comprising positive feed-back circuits each providing a different amount of positive feed-back, means for selecting said feed-back circuits at will, and means for introducing in circuit with said parallel resonant circuit resistances arranged to normalize the gain of said filter for all selections effected by said means for selecting.

5. A variable band-width filter having constant gain, said filter including an input terminal, a parallel resonant circuit having a low impedance tap, a variable resistance connected between said input terminal and said tap, a cathode follower amplifier having an input circuit and a cathode follower output circuit, means connecting said input circuit across said parallel resonant circuit, a positive feed-back path connected from said output circuit to said low impedance tap, said positive feed-back path including a variable series resistance, a further variable series resistance connectible from said low impedance tap to a point of reference potential, and means for enforcing selection of values of said variable resistances such that said filter has variable band-width and constant gain for all bandwidths.

6. In a spectrum analyzer having a heterodyne modulator connected in cascade with a source of time varying signal having a frequency spectrum, an intermediate frequency amplifier coupled in cascade with said modulator, a scanning local oscillator coupled to said modulator, and a visual display unit coupled with said intermediate frequency amplifier and arranged to provide a plot of amplitude of response of said intermediate frequency amplifier as a function of frequency of said local oscillator, wherein said intermediate frequency amplifier includes at least one active filter including a resonant circuit having a normal Q value, where Q is the figure of merit of said filter, means for at will changing said Q values including means for at will raising and lowering said Q values selectively, said active filter including means for normalizing the response of said active filter to a common level for all said Q values.

7. The combination according to claim 6 wherein is further provided means comprising a frequency discriminator circuit coupled in cascade with said intermediate frequency for blocking said visual display unit for all frequencies intermediate a pair of predetermined values located internally of the selectivity characteristic of said intermediate frequency amplifier.

8. A variable bandpass filter having constant gain as bandwidth is varied, comprising filter input and output terminals, a parallel, resonant circuit turned to the bandpass center frequency, said circuit having input and output terminals, a first variable attenuator coupled between the input terminals of said filter and said circuit, a positive feedback network selectively coupled between the filter output and circuit input terminals, said network including a second variable attenuator for controlling the amount of feedback current, and a third variable attenuator selectively connected to said circuit for loading said circuit, said attenuators being variable together to compensate for amplitude response changes in said circuit resulting from bandwidth changes in said circuit.

9. A variable bandpass filter having constant gain as bandwidth is varied, comprising filter input and output terminals, a parallel, resonant circuit tuned to the bandpass center frequency, said circuit having input and output terminals, a first variable resistor coupled between the input terminals of said filter and said circuit, a positive feedback network selectively coupled between the filter output and circuit input terminals, said network including a second variable resistor for controlling the amount of feedback current, and a third variable resistor selectively connected to said circuit for loading said circuit, said resistors being variable together to compensate for amplitude response changes in said circuit resulting from bandwidth changes in said circuit.

10. A variable band-width filter having constant gain, said filter including a parallel resonant circuit, a low impedance output amplifier having an input circuit and a low impedance output circuit, said amplifier introducing substantially zero phase shift between said input and output circuit, means coupling said parallel resonant circuit to said input circuit, means coupling said output circuit regeneratively to said input circuit, said last means comprising positive feed-back circuits each providing a different amount of positive feed-back, means for selecting said feed-back circuits at will, and means for introducing in circuit with said parallel resonant circuit resistances arranged to normalize the gain of said filter for all selections effected by said means for selecting.

11. In combination, a source of a time varying signal having a frequency spectrum, means for recording said time varying signal, means for reproducing the recorded signal, spectrum analyzer coupled to said means for repeatedly reproducing the recorded signal, said spectrum analyzer including a heterodyne modulator coupled in cascade to said reproducer, an intermediate frequency amplifier coupled in cascade with said modulator, a marking means for marking on a mark receiver as a function of the amplitude of response of said intermediate frequency amplifier, a scanning local oscillator coupled to said modulator, means for relatively moving said marking means and said mark receiver in synchronism with said scanning local oscillator, said intermediate frequency amplifier including an active filter, said active filter including a parallel resonant circuit having a normal Q value, where Q is the figure of merit of said filter, switching means for at will changing said Q value including means for at will raising and lowering said Q value selectively, said active filter including means for normalizing the response of said filter to a common level for all said Q values, means comprising a frequency discriminator circuit for blocking said marking means for all frequencies outside a pair of predetermined values located internally of the selective characteristic of said intermediate frequency amplifier, and means for varying said predetermined values comprising further switching means ganged with said first mentioned means.

References Cited in the file of this patent

UNITED STATES PATENTS

| | | |
|---|---|---|
| 2,100,236 | Brown | Oct. 31, 1937 |
| 2,178,072 | Fritzinger | Oct. 31, 1939 |
| 2,278,801 | Rust et al. | Apr. 7, 1942 |
| 2,403,982 | Koenig | July 16, 1946 |
| 2,425,003 | Potter | Aug. 5, 1947 |
| 2,429,229 | Koenig | Oct. 21, 1947 |
| 2,429,236 | Potter | Oct. 21, 1947 |
| 2,459,046 | Rieke | Jan. 11, 1949 |
| 2,498,954 | Heller | Feb. 28, 1950 |
| 2,579,345 | Sziklai | Dec. 18, 1951 |
| 2,639,375 | Vilkomerson | May 19, 1953 |
| 2,727,139 | Hollandbeck | Dec. 13, 1955 |
| 2,730,577 | Winters | Jan. 10, 1956 |
| 2,852,624 | Young | Sept. 16, 1958 |
| 2,933,694 | Carter | Apr. 19, 1960 |
| 2,967,273 | Hurvitz | Jan. 3, 1961 |
| 2,967,274 | Hurvitz | Jan. 3, 1961 |
| 2,973,478 | Hurvitz | Feb. 28, 1961 |

FOREIGN PATENTS

| | | |
|---|---|---|
| 119,562 | Australia | Mar. 1, 1945 |

OTHER REFERENCES

"Radio Frequency Wave Analyzer," article in Tele-Tech, December 1950, pp. 37–40.

Filter Circuit, IBM Technical Disclosure Bulletin, vol. 2, No. 4, December 1959.